United States Patent [19]

Kawamoto

[11] Patent Number: 4,855,174
[45] Date of Patent: Aug. 8, 1989

[54] LAGGING-REINFORCED STRUCTURE

[76] Inventor: Masaichi Kawamoto, 2-33 Dairihonmachi 2-chome, Moji-ku, Kitakyushu-shi, Fukuoka, Japan

[21] Appl. No.: 841,487

[22] Filed: Mar. 19, 1986

[51] Int. Cl.$^4$ .......................... B65G 15/34; B44C 1/26
[52] U.S. Cl. ................... 428/67; 198/690.2; 198/699.1; 198/844; 198/847; 198/957; 428/141; 474/191; 474/192
[58] Field of Search .................. 474/191, 192, 185; 428/67; 29/DIG. 73, 99; 198/957, 688.1, 690.2, 699, 699.1, 844, 846, 847; 156/137

[56] References Cited

U.S. PATENT DOCUMENTS

| | | | |
|---|---|---|---|
| 248,547 | 10/1881 | Wynkoop | 428/67 |
| 2,364,226 | 5/1940 | Larmour | 428/67 |
| 3,607,606 | 9/1971 | Beninga | 428/67 |
| 3,930,083 | 12/1975 | Pinkham | 428/67 |
| 4,222,482 | 9/1980 | Kelley | 198/957 |
| 4,673,380 | 6/1987 | Wagner | 474/192 |

FOREIGN PATENT DOCUMENTS

| | | | |
|---|---|---|---|
| 0533694 | of 1922 | France | 428/67 |
| 1028652 | of 1953 | France | 428/67 |
| 30497 | of 1904 | Switzerland | 428/67 |
| 839672 | of 1958 | United Kingdom | 428/67 |
| 8200326 | 2/1982 | World Int. Prop. O. | 474/192 |

Primary Examiner—George F. Lesmes
Assistant Examiner—J. B. Monroe
Attorney, Agent, or Firm—Jordan and Hamburg

[57] ABSTRACT

The present invention discloses a lagging-reinforced structure which comprises a substrate, a lining layer of a flexible and resilient material coated on the upper surface of the substrate, a plurality of laggings embedded in the lining, the laggings having an anchoring portion at the embedded end thereof, and the laggings made of a material of high hardness and high wear resistance. Due to such construction, the peeling-off of the lagging from the lining layer can be effectively prevented.

3 Claims, 9 Drawing Sheets

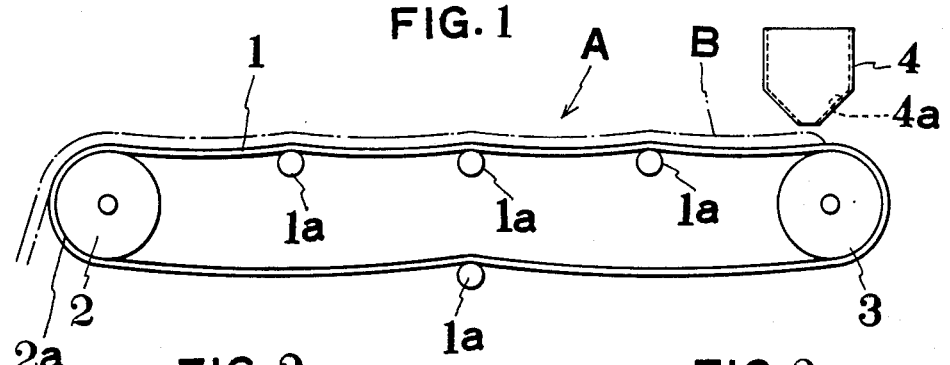
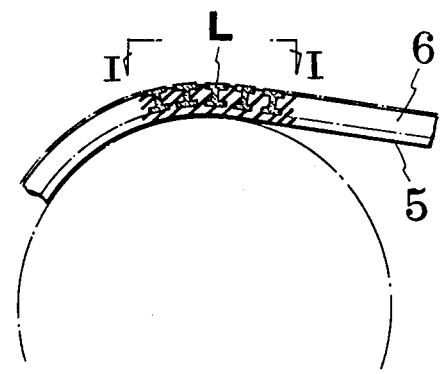
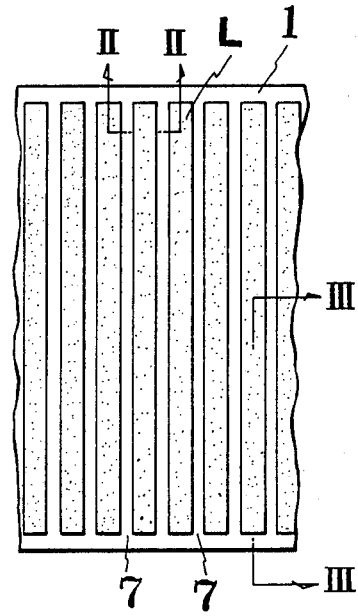
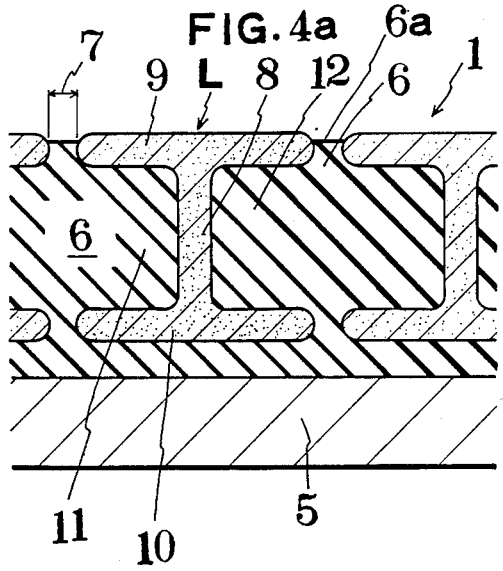
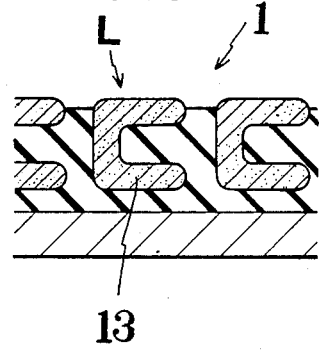

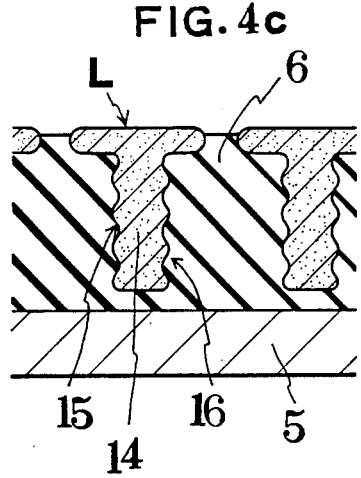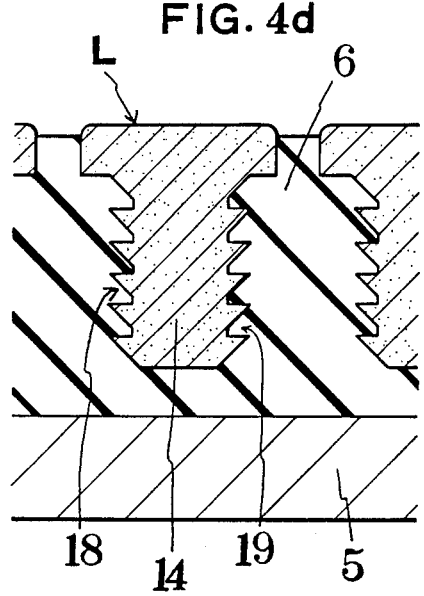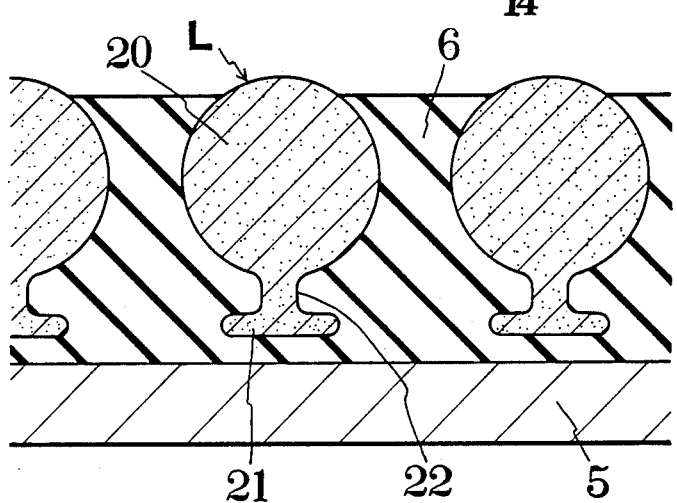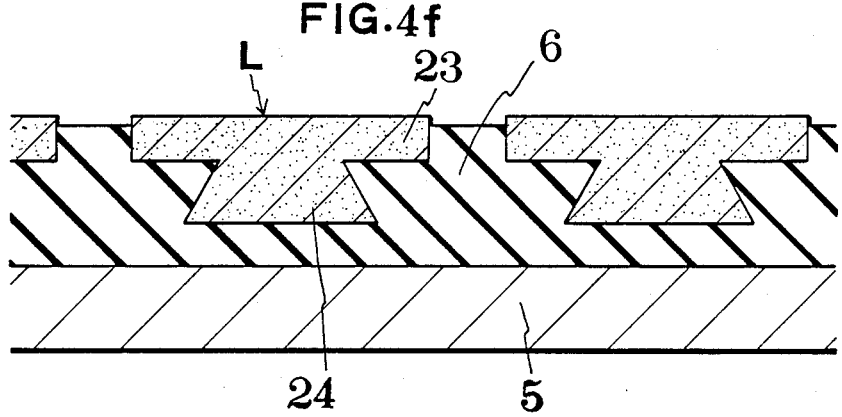

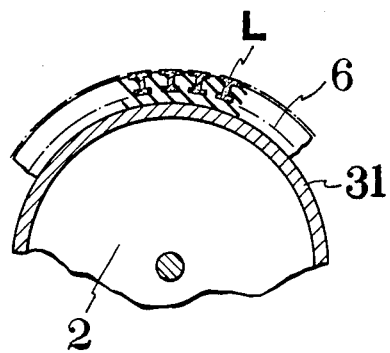
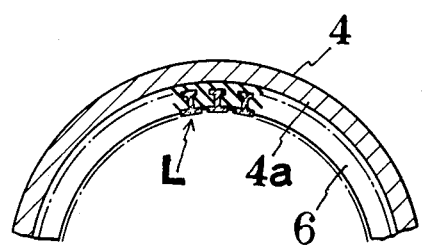
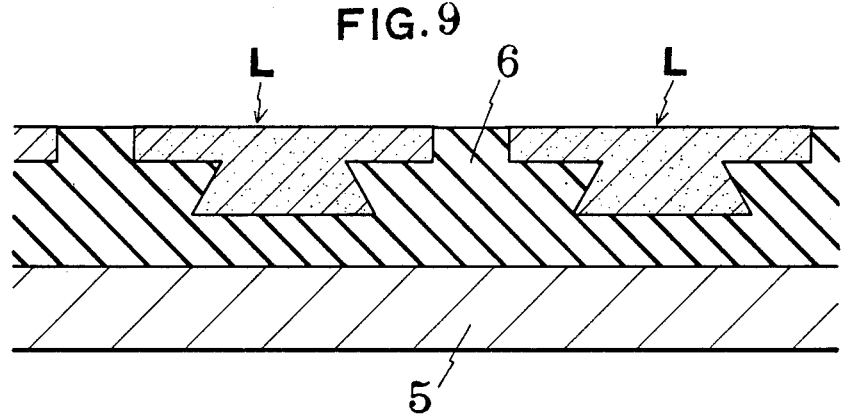
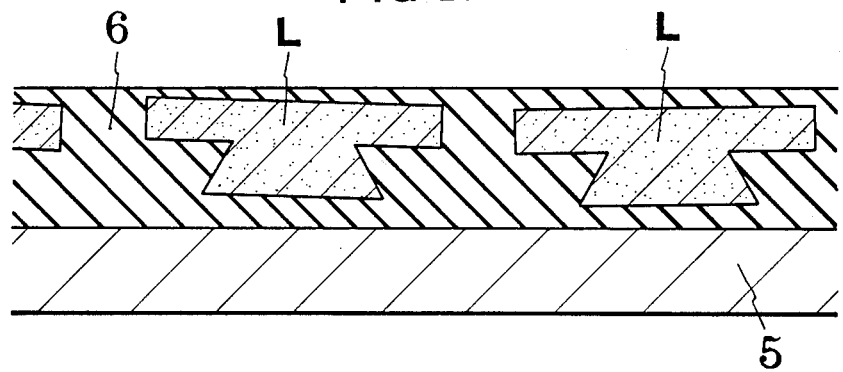

LAGGING-REINFORCED STRUCTURE

BACKGROUND OF THE INVENTION

This invention relates to a structure which is reinforced by laggings of high wear-resistance.

Conventionally, for preventing the wear of the surface of a conveyor belt or pulley, or the inner surface of a hopper receiving ore or gravel, the laggings having high hardness and wear resistance are attached to or embedded in these substrates.

However, the effective area of laggings for wear resistance is very small relative to the total area of the surface of the substrate, although the laggings occupy considerable space in the substrates.

Furthermore, such laggings tend to be easily peeled off from the surface of the substrate.

Accordingly, it is an object of the present invention to provide a lagging-reinforced structure where the laggings have sufficient effective wear-resistance area relative to the total surface of the substrate and can considerably prolong the life of the structure by minimizing the wear of the suructures.

It is another object of the present invention to provide a lagging-reinforced structure where the laggings are firmly secured to the structure so that the peeling-off of the laggings can be effectively prevented.

In summary, the present invention discloses a lagging-reinforced structure which comprises a substrate, a lining coated on the upper surface of said substrate, a plurality of laggings embedded in said lining, said laggings having an anchoring portion at the embedded end thereof, and said laggings made of a material of high hardness and high wear resistance.

BRIEF EXPLANATION OF DRAWINGS

FIG. 1 is a schematic view of a belt conveyor which demonstrates one of the lagging-reinforced structures of the present invention.

FIG. 2 is an enlarged explanatory view of the front portion of the belt conveyor.

FIG. 3 is a plan view of the belt conveyor observed in arrow direction I—I in FIG. 2.

FIGS. 4a to 4j are cross-sectional view of the lagging taken along II—II of FIG. 3.

FIG. 4i is a cross-sectional view taken along the line III—III of the FIG. 4j.

FIG. 7 is an explanatory view showing the lagging-reinforced structure applied to the pulley of the belt conveyor.

FIG. 8 is an explanatory view showing the lagging-reinforced structure applied to the hopper of the belt conveyor.

FIG. 9 to FIG. 10 are cross sectional views of the lagging-reinforced structure where the lagging has the upper surface of the laggings on the same plane or below the surface of the lining layer.

DETAILED DESCRIPTION OF DISCLOSURE

Figure 4G:
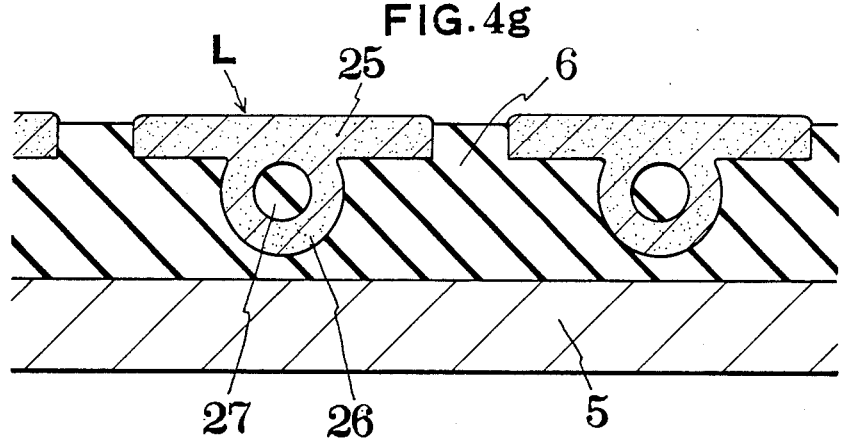

The lagging-reinforced structure of the present invention is hereinafter disclosed in conjunction with attached drawings.

In FIG. 1, A indicates a belt conveyor which comprises an endless conveyor belt 1 which, in turn, extends between and is wound around a drive pulley 2 and a driven pulley 3.

For preventing the slacking of the endless conveyor belt 2, a plurality of guide rollers 1a are disposed between the drive pulley 2 and the driven pulley 3 and support the endless conveyor belt 1.

Above one end of the endless belt 2, a hopper 4 is disposed for feeding the material B to be transfered such as gravel or ore onto the endless conveyor belt 1.

In the above belt conveyor A, the conveyor belt 1 comprises a substrate 5 (FIG. 4a to FIG. 4j) which is made of a textile having high tensile strength and flexibility such as niron textile or glass fiber textile or carbon fiber textile.

Furthermore, such substrate 5 can be made of a plurality of cords extending in the same direction as the running direction of the conveyor belt 1 and fixedly secured to each other in a transverse direction.

Such cord may be a fiber strip such as nylon or steel strip having a sufficient flexibility and tensile strength.

The upper surface of the substrate 5 is coated with a flatplate-shaped lining layer 6 and such lining layer 6 is made of a flexible and resilient material such as rubber.

The lining layer 6 is preferably connected to the substrate 5 by means of a suitable bonding agent.

In conveying the material B which may be gravel or ore, the upper surface 1a of the belt 1 and the inner surface 4a of the hopper 4 are subjected to the wear action of the material B, while the outer surface 2a of the drive pulley 2 is subjected to the wear action of the inner surface of the conveyor belt 1.

For preventing the above wear resistance, a plurality of laggings L are embedded in the outer surface 1b of the conveyor belt 1 as shown in FIG. 2 and FIG. 3.

As shown in FIG. 2 and FIG. 3, each lagging L is shaped like an elongated bar and these laggings L extend in a direction transverse to the running direction of the conveyor belt 1 with a suitable longitudinal gap 7 in the running direction of the conveyor belt 3.

Laggings L may be produced by a bar made of an extremely high and wear-resistant material such as ceramics.

Such ceramic-made laggings L are produced, for example, in such a manner that 80 to 90% by weight of alumina powder having a particle size of less than 10 $\mu$m is mixed with 20 to 10% by weight of a bonding agent mainly composed of silica powder to provide a raw material mixture and such mixture is compacted in an elongated-bar-like shape and the compact is sintered under a conventional sintering condition.

The laggings L can take any cross section provided that the laggings L have an anchoring portion at the embedded end thereof.

In FIG. 4a, the cross-section of the lagging L is of an approximately laid-H-shape which comprise a vertical upright portion 8 and an upper and lower horizontal portion 9, 10 which are integrally connected to the upper and lower ends of the vertical portion 8.

Lagging L is almost totally embedded in the lining layer 6 with the exception of the upper horizontal portion 9 and the surface of the upper horizontal portion 9 slightly protrudes from the upper surface of the lining layer 6 so as to protect the wear of the surface of the conveyor belt 1.

Furthermore, the lagging L forms a pair of rectangular-shaped lateral recesses 11,12 on the both sides of the vertical portion 8 of the lagging L.

In the above construction, the lagging L is almost completely embedded in the lining layer 6 and the lower horizontal portion 10 which is embedded in the deep portion of the lining layer 6 acts as an anchoring means so that the removal of the laggings L can be prevented.

Furthermore, since the portions of the lining layer 6 intrudes into the lateral recesses 11,12 provided at both lateral sides of the vertical upright portion 9 of the lagging L, the uniting force between the lagging L and the lining layer 6 is enhanced so that the removal of the laggings L is further effectively prevented.

Still furthermore, since the upper horizontal portion 9 of the laggings L has a considerable width and the gap between the opposed lateral edges of the neighboring laggings is narrow, the conveyor belt 1 can assure a sufficient area for wear resistance.

In FIG. 4b, the lagging L has a C-shaped cross section and an anchoring means is provided at the lower horizontal portion 13 of the lagging L.

In FIG. 4c, the lagging L is provided with a T-shaped cross-section and a vertical portion 14 is provided with a plurality of corrugated recesses 15, 16 on both sides thereof.

In FIG. 4d, the lagging L is provided with a T-shaped cross-section and a vertical portion 17 is provided with a plurality of serrated recesses 18, 19 on both sides thereof.

In FIG. 4e, the lagging L has a cross section which comprises a circular portion 20 which has a top round portion slightly protruding from the upper surface of the lining 6 and a lower horizontal portion 21 integrally connected to the circular portion by way of a vertical leg portion 22.

In FIG. 4f, the lagging L has a cross section constituted by a combination of an upper portion 23 of a flat rectangular shape and a lower portion 24 of a dove-tail shape which acts as an anchor.

In FIG. 4g, the lagging L has a cross section constituted by a combination of an upper portion 25 of a flat rectangular shape and a lower portion 26 of a hollow ring-like shape which acts as the anchor.

Since the lower portion 26 is provided with a circular space 27 in which the lining material is fed, the integrity of the lagging L with the lining 5 is further enhanced.

Figure 4H:
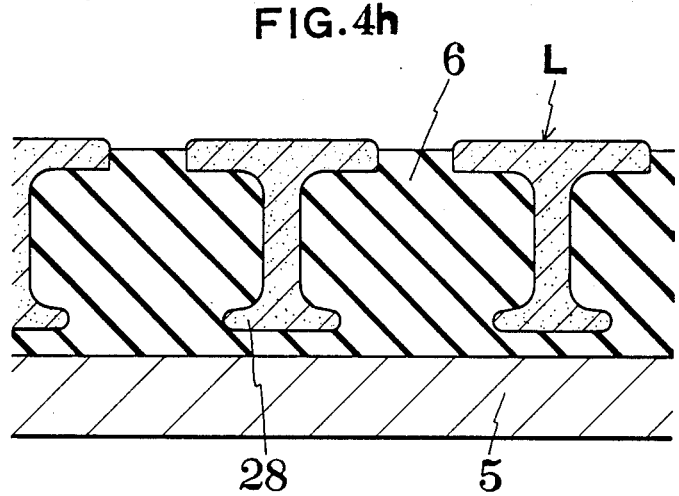

In FIG. 4h, the lagging L has a cross section of a T shape with a short lower horizontal leg 28 which acts as an anchor.

Figure 4I:
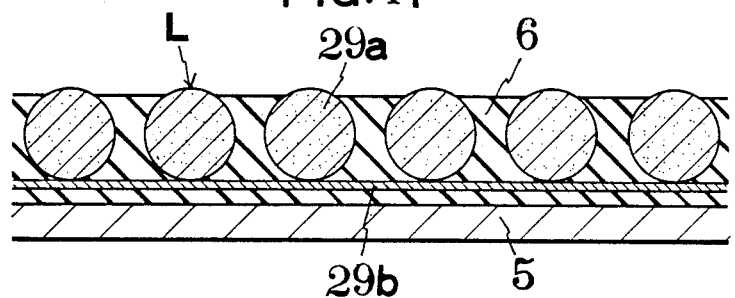
Figure 4J:
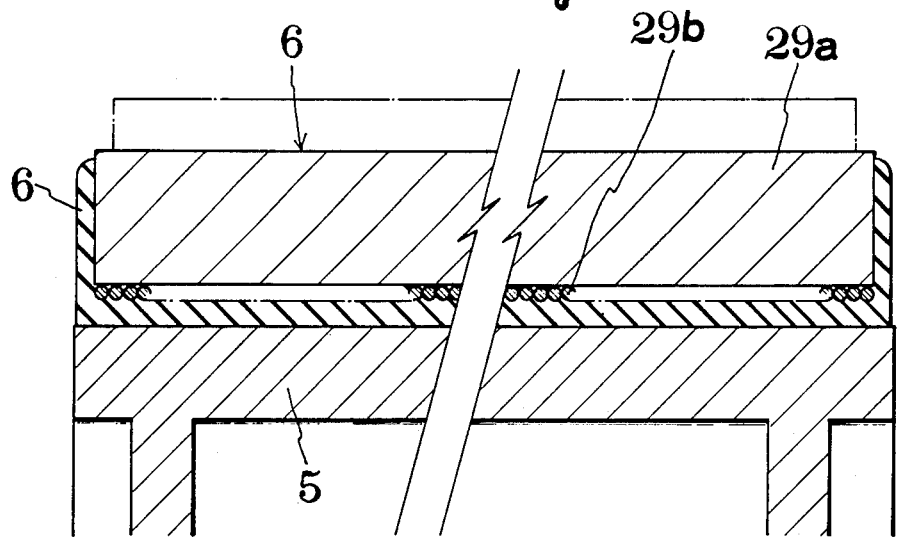

In FIG. 4i and FIG. 4j, each lagging L has a circular cross section 29 and these laggings L are connected each other by means of a plurality of flexible bars 29b which acts as an anchor.

Although some of the preferable cross sections of the laggings are described in FIGS. 4a to 4j, the cross-sectional view of the laggings L can be varied depending on the use of the lagging-reinforced structure.

Figure 5:
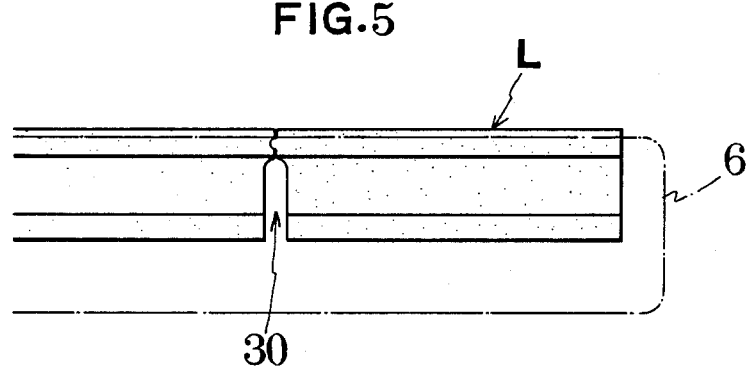
FIG. 5 is a cross-sectional view of the belt conveyor taken along the line IV—IV of FIG. 3. showing the lateral end of the laggings.
Figure 6:
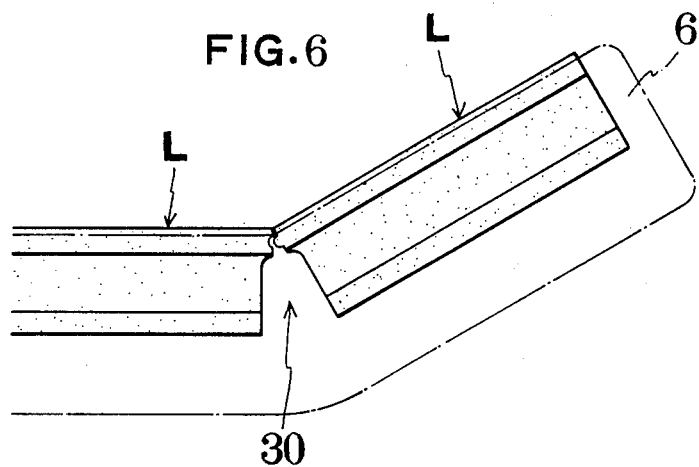
FIG. 6 is an explanatory view showing the lagging in a bent condition.

In FIG. 5 and FIG. 6, the left and right lateral sides of the conveyor belt 1 can be deflected upwardly so as to prevent the lateral overflow of the material from the conveyor belt 3.

Namely, each lagging L is provided with vertical slit 30 which extends upwardly from the lower surface of the conveyor belt 1 so as to deflect the belt 3 in the above manner.

FIG. 7 shows an embodiment where the lagging-reinforced structure of the present invention is applied to the outer surface 31 of the drive pulley 2, wherein the outer surface 31 is provided with a plurality of the laggings L having the cross-section in FIG. 4a.

FIG. 8 shows an embodiment where the lagging-reinforced structure of the present invention is applied to the inner surface 4a of the hopper 4, wherein the inner surface 4a is provided with a plurality of the laggings L shown in FIG. 4a.

Although, in the above construction, it is preferable that the upper surface of the laggings L protrudes slightly from the surface of the lining layer 6, the upper surface of the lagging L may be on the same plane or below the upper surface of the lining layer 6 as shown in FIG. 9 and FIG. 10 in view of the lowering of the production cost of the conveyor belt 1 or other lagging-reinforced structure.

Figure 11:
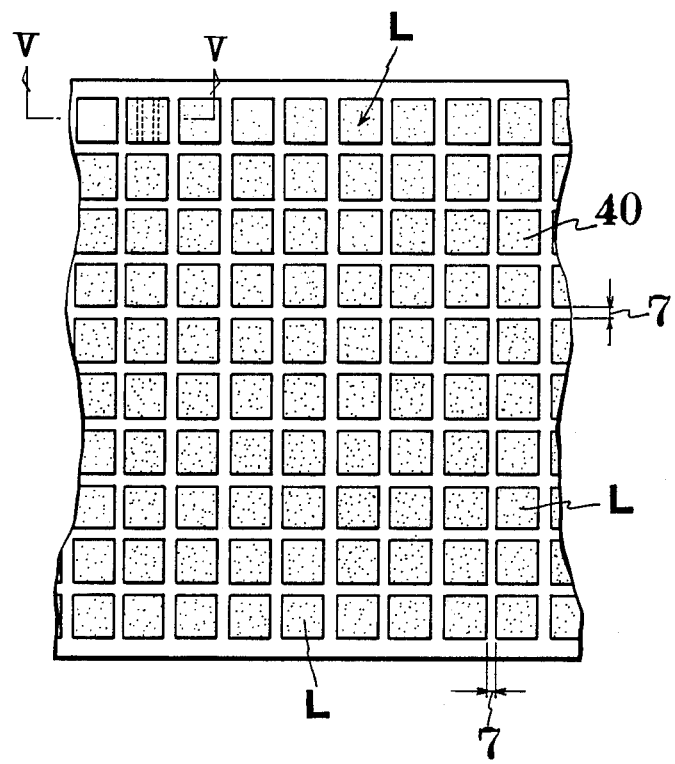
FIG. 11 is a plan view of the lagging-reinforced-structure which is provided with a tile-like laggings.

FIG. 11 shows a lagging-reinforced structure where a plurality of tile-like laggings L are embedded into the lining 6 of the conveyor belt 1.

Figure 12:
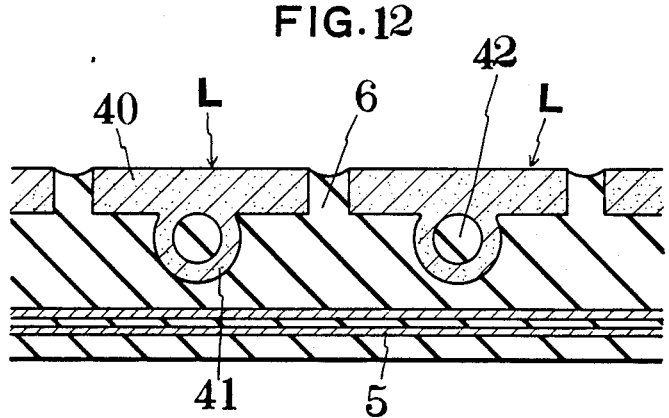
FIG. 12 is a cross-sectional view of the above lagging-reinforced structure of taken along the line V—V of FIG. 11.
Figure 13:
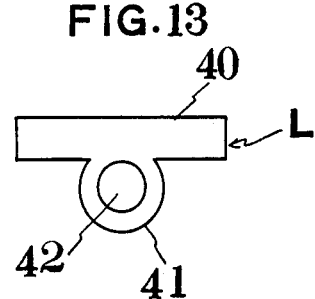
FIG. 13 and FIG. 14 are plan and side view of the above tile-like lagging.
Figure 14:
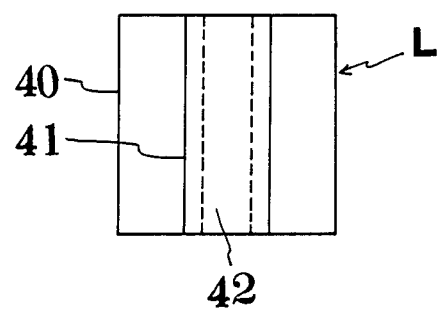

As shown in FIG. 12 to FIG. 14, the lagging L comprises a flat square plate 40 and a hollow circular anchoring portion 41 which is fixedly secured to the lower surface of the lining layer 6.

Since the anchoring portion 41 has a hollow space 42 therein where the lining material intrudes during the lining forming process, the peeling of the tile-like laggings L can be effectively prevented.

Since such tile-like laggings L can form gaps 7 not only in a longitudinal direction but also in a lateral direction, the flexibility of the lagging L relative to the lining layer 5 is enhanced so that the lagging L is not ruptured even when an unexpected load is applied to the laggings L.

Figure 15:
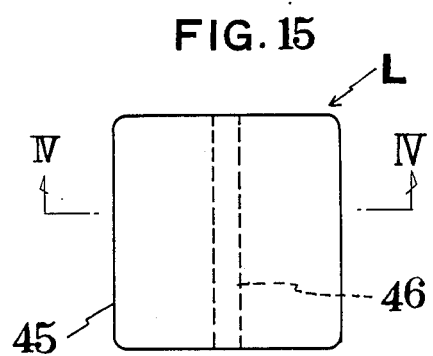
FIGS. 15 and 16 are plan and side views of the tile-like laggings applicable to the above reinforced structure of FIG. 11.
Figure 16:
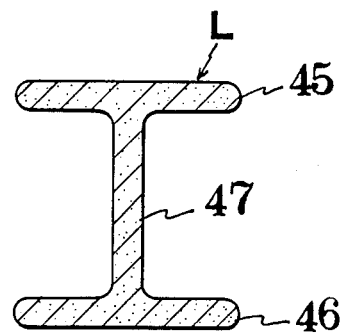

FIG. 15 and FIG. 16 show the tile-like lagging L which comprises an upper and lower square plate portions 45, 46 and a vertical strut portion 47 which connects the square plate portions 45, 46. In the above construction, the lower square portion 46 acts as the anchoring means for preventing of the peeling-off of the tile-like laggings L.

Figure 17:
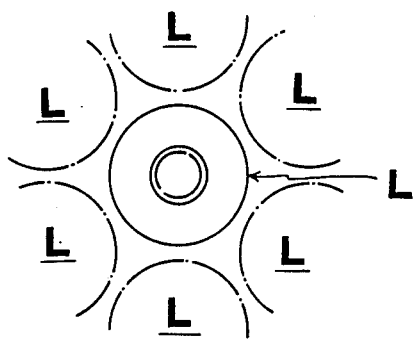
FIGS. 17 and 18 are plan views of other tile-like lagginngs.
Figure 18:
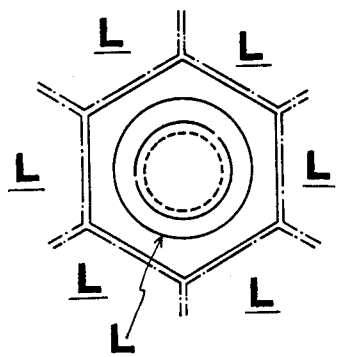

FIG. 17 and FIG. 18 show some of the preferable shape of tile-like laggings L, where the lagging L has a circular cross section and the hexagonal cross section.

Figure 19:
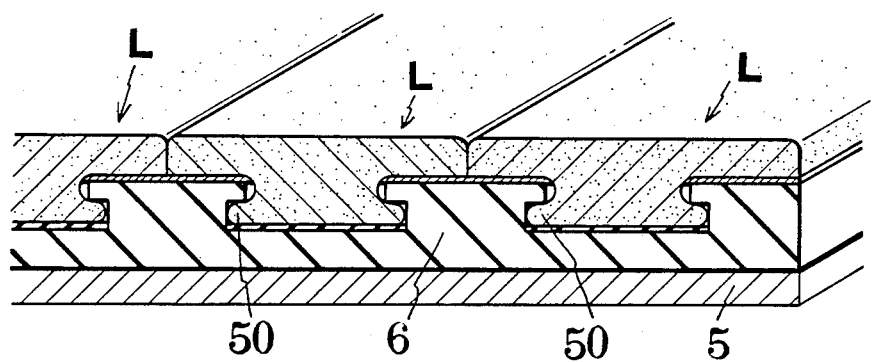
FIG. 19 and FIG. 20 are schematic views of another lagging-reinforced structure where the surface of the substrate is completely covered by the flat plate-like laggings.

FIG. 19 is a schematic view of another lagging-reinforced-structure where the lining layer 6 is completely covered by the laggings L, wherein in FIG. 17, the lagging L has a T-shaped cross section and an anchoring portion is formed by integrally attaching the horizontal leg 50 to the lower end of the vertical portion of the T-shape.

Figure 20:
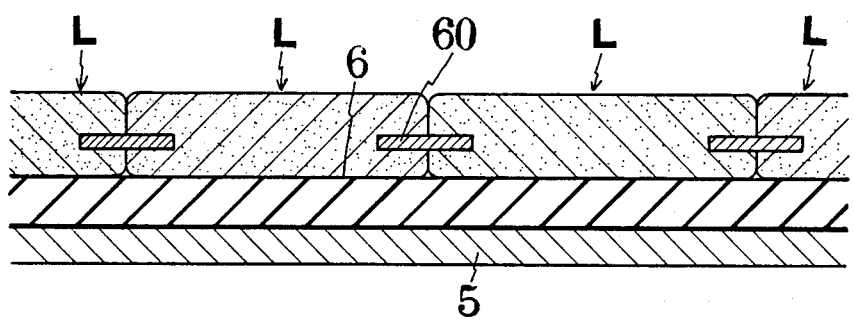

In FIG. 20, the laggings L are connected with a connecting means 60.

Furthermore, the shock-resistance of the lagging L can be improved by choosing a desired material.

According to this invention, since the recess or recesses is/are formed on both lateral side of the embedded portion of the lagging, the effective area for preventing the wear relative to the mass of the lagging can be increased and the peeling-off of the lagging can be prevented.

Although not shown in the attached drawings the lagging-reinforced structure of the present invention can be applied to any surface of the structure where the prevention of the wear is necessary.

What we claim is:

1. A lagging-reinforced conveyor comprising:
   (a) a flexible substrate having a predetermined width,
   (b) a lining layer coated on a first surface of said substrate, said lining layer being made of a flexible resilient material, and
   (c) a plurality of laggings embedded in said lining layer, said laggings each having a first flange portion of a width substantially equal to the width of said substrate, a second flange portion of a length substantially equal to the width of said substrate and facing said substrate, said second flange portion being parallel to and spaced from said first flange portion, and a vertical rib portion which has first and second opposite edges integrally connected to central portions of said first and second flange portions, respectively, said laggings being made of a material of high hardness and high wear resistance, each of said laggings defining first and second rectangular grooves on opposite respective sides of said vertical rib portion into which portions of said lining layer extend, said portions of said lining layer having the same shape and size as said rectangular grooves and being firmly engaged therein, the sum of the depths of said grooves being large as compared with the transverse dimensions of said first and second flanges, whereby the removal of said laggings from said lining layer is prevented by the engagement of said portion of said lining layer with said grooves.

2. A lagging-reinforced structure according to claim 1, wherein said lining layer is a rubber.

3. A lagging-reinforced structure according to claim 1, wherein said material for said laggings is ceramic.

* * * * *